United States Patent
Fontana et al.

(10) Patent No.: US 6,189,549 B1
(45) Date of Patent: Feb. 20, 2001

(54) WASTE MATERIAL SKIMMING DEVICE

(75) Inventors: Louis B. Fontana; Gerald B. Davis, both of Humboldt, IA (US)

(73) Assignee: ADF Systems, Ltd., Humboldt, IA (US)

( * ) Notice: Under 35 U.S.C. 154(b), the term of this patent shall be extended for 0 days.

(21) Appl. No.: 09/312,804

(22) Filed: May 17, 1999

(51) Int. Cl.[7] ............................. B08B 13/00; B01D 21/02
(52) U.S. Cl. ......................... 134/109; 210/801; 210/803; 210/804; 210/805; 210/167; 210/320; 210/521; 210/525
(58) Field of Search ............................ 134/109; 210/776, 210/801, 803, 804, 805, 167, 195.3, 320, 521, 525

(56) References Cited

U.S. PATENT DOCUMENTS

| | | | |
|---|---|---|---|
| 3,744,637 | * 7/1973 | Ziegler | 210/525 X |
| 3,788,477 | * 1/1974 | Love | 210/525 X |
| 3,862,039 | 1/1975 | Summers . | |
| 4,132,645 | 1/1979 | Bottomley et al. . | |
| 4,316,805 | 2/1982 | Faust et al. . | |
| 4,592,845 | * 6/1986 | Lejeune et al. | 210/525 X |
| 4,652,371 | * 3/1987 | Love | 210/521 X |
| 4,844,819 | 7/1989 | Norman . | |
| 5,277,208 | 1/1994 | Mansur . | |
| 5,522,990 | 6/1996 | Davidian . | |
| 5,601,705 | 2/1997 | Glasglow . | |
| 6,099,743 | * 8/2000 | Pedersen | 210/521 X |

* cited by examiner

Primary Examiner—Philip R. Coe
(74) Attorney, Agent, or Firm—Jenkens & Gilchrist

(57) ABSTRACT

A compact, self-contained skimming system for removing waste material from aqueous cleaning solutions used in parts washers. A single tank contains a sloped floor, two compartments separated by a baffle, and an opening between a bottom edge of the baffle and the floor. Waste liquid collects in the first stage compartment, where gravity initially separates water and coarse debris from the waste material containing oil and grease, some water, and fine debris. A partially immersed rotating skimmer further adsorbs the waste material. A waste collection system transfers the waste material to the second stage compartment, where gravity further separates the fine debris and additional water from the oil and grease. The oil and grease flow through a waste drainage system out of the second stage compartment. The fine debris and water flow along the downwardly sloping floor, through the opening at the bottom of the baffle back into the first stage compartment. A single tank may incorporate multiple baffles, skimmer systems, and waste collection systems to perform the separation process in stages.

16 Claims, 7 Drawing Sheets

WASTE MATERIAL SKIMMING DEVICE

BACKGROUND OF THE INVENTION

1. Technical Field of the Invention

The present invention relates to a device for collecting and separating a waste material containing oil and grease from an aqueous solution. More particularly, it relates to a compact, self-contained skimming device for removing oil and grease from an aqueous cleaning solution used in parts washers.

2. Description of Related Art

Industrial machinery parts washers utilize high pressure sprays of either solvent or aqueous cleaning solution to remove oil, grease, debris and sediment from the machinery parts. Users may either dispose of or filter and recycle the resulting waste cleaning solution. Disposal of the solution without recycling is costly and impractical. Regulators often classify such a solution that is contaminated with oil as a hazardous waste. Such a classification raises environmental concerns and increases the cost of disposal. If the user filters the recycled solution, the filters can clog up quickly and must be replaced frequently, which is also costly and impractical. The problem is further exacerbated if the waste cleaning solution contains large amounts of oil and grease. Oil and grease that accumulate in a washer system can cause operating problems such as cleaning difficulties, machine down-time, greater equipment wear, contamination of the cleaning solution, and possible bacteria growth in the oil and grease accumulated in the system.

Oil-water separators are available to extract oil and other lightweight pollutants from water. Power-spray parts washers utilize such devices, in conjunction with filters to remove debris, to recycle aqueous cleaning solutions. Industrial processes employ some devices to purify contaminated water before returning the water to the environment. Other devices skim oil off of the top of oil-water mixtures from the output of oil refinery storm sewer systems. Still other devices separate lubricating oil from aqueous coolant used in machining operations.

Large gravity separators and extractors separate oil from aqueous solutions by using either portable or centralized pumping systems. Such systems require user training, large amounts of power, and labor to operate. They occupy significant amounts of space and are expensive to purchase.

Designers have developed numerous small unattended oil removal devices, including belt, drum, and disk oil collection or skimming devices. However, each such device has disadvantages. Belt devices remove large amounts of water together with the oil and grease. The belt material also may be adversely affected by the heat of the wash water or the chemical composition of the cleaning solution. Drum devices occupy a large amount of space. They also remove a large quantity of water together with the oil and grease. Current disk skimmers also tend to remove much of the water together with the oil and grease. They employ multiple tanks, are heavy and bulky, and occupy a sizable area. Current designs utilize numerous components and require many manufacturing steps and user assembly. They require a second, secondary process step or a separate module for the separation of the oil and grease from the water. Some utilize screens to separate granules of loose debris from the oil and grease.

SUMMARY OF THE INVENTION

The present invention provides a device for removing waste material containing oil and grease from an aqueous solution. The self-contained device includes a single tank with a baffle dividing the tank into two compartments. The device further includes a system to skim waste material from the first stage compartment, collect the waste material in the second stage compartment, and then drain the collected waste material, with non-waste material being returned from the second stage compartment to the first stage compartment.

The single tank contains a sloped floor, two compartments separated by a baffle, and an opening between a bottom edge of the baffle and the sloped floor. Waste liquid, from for example a washing operation, collects in a first stage compartment, where gravity partially separates water and coarse debris from a waste material containing oil and grease, a small amount of water, and fine debris. The waste material is then skimmed from the first stage compartment and deposited in a second stage compartment. In the second stage compartment, gravity further separates the fine debris and additional water from the collected oil and grease. A waste drainage system then transfers the oil and grease out of the second stage compartment. The water and fine debris then flow out of the second stage compartment along the downwardly sloping floor, through the opening at the bottom of the baffle, and back into the first stage compartment.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1A:
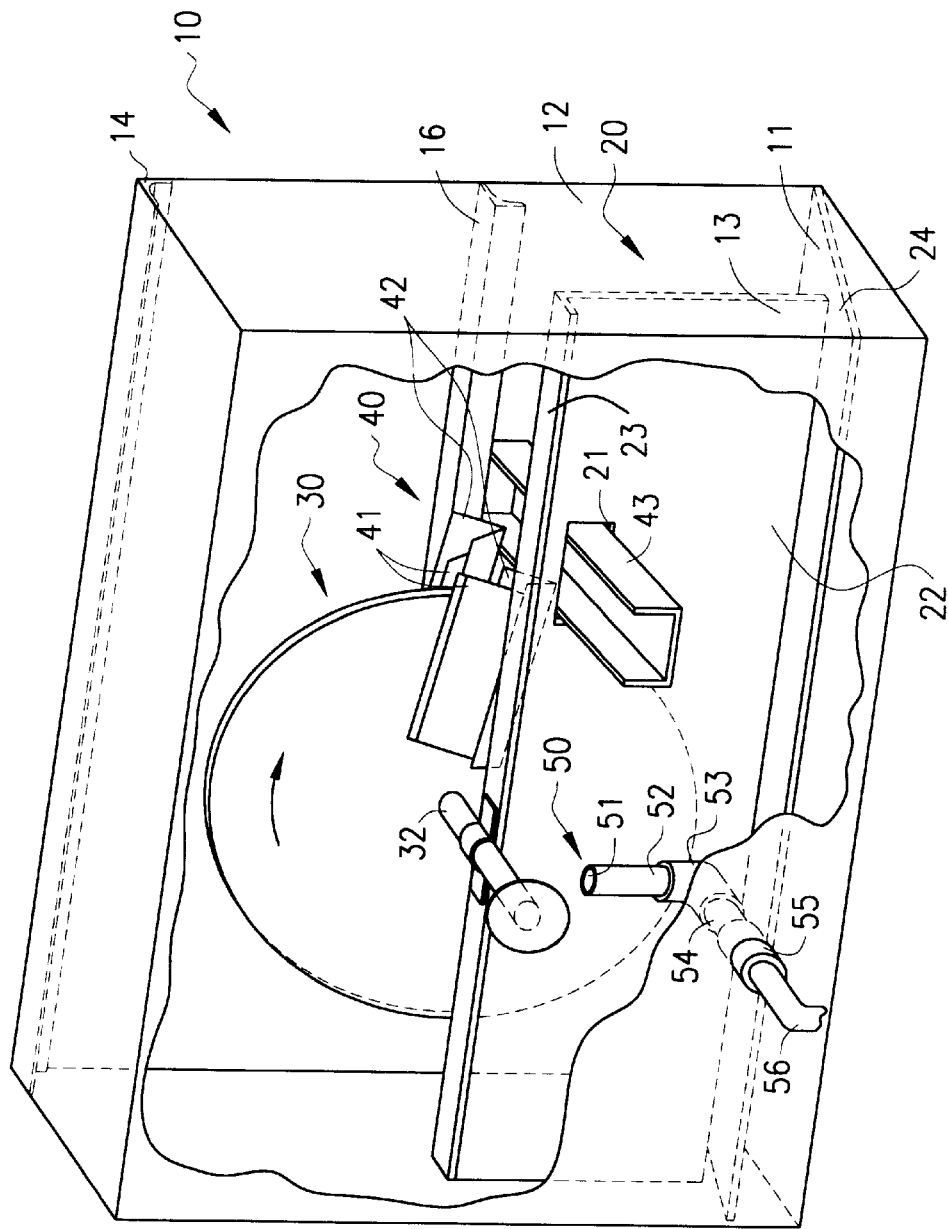
FIG. 1A is a partially cut-away perspective view of the preferred embodiment of the present invention, as viewed from the drain side of a tank.
Figure 1B:
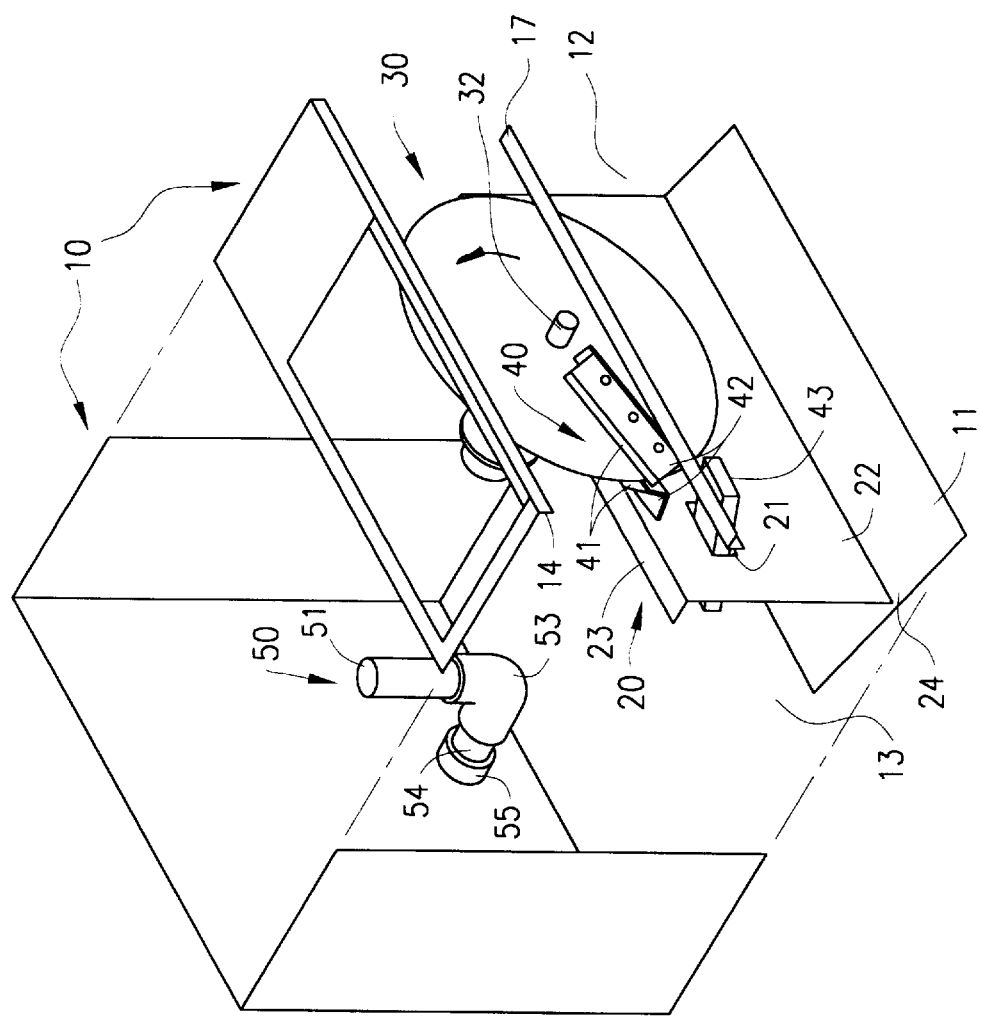
FIG. 1B is an exploded perspective view of the preferred embodiment of the present invention, as viewed from the skimmer side of the tank.

In general, FIGS. 1A and 1B show perspective views of a skimmer in accordance with the present invention. The skimmer includes a single tank 10, with the tank having a sloped floor 11 and including two compartments 12 and 13 separated by a baffle 20. The skimmer further includes a skimmer system 30 positioned to skim waste material from the first stage compartment 12 with a waste collection system 40 then depositing the skimmed waste material into the second stage compartment 13. The second stage compartment 13 further includes a waste drainage system 50 for removing waste material from the skimmer.

Waste liquid (not shown), from for example a washing operation, collects in the first stage compartment 12, where gravity acts to make an initial separation of water and coarse debris from a waste material containing oil and grease, a small amount of water, and fine debris. The waste material is then adsorbed by a partially immersed rotating skimmer disk 31 of the skimmer system 30. The waste collection system 40 collects the waste material from the skimmer disk 31 for transfer to the second stage compartment 13, where gravity further separates the fine debris and additional water from the oil and grease. The oil and grease is then transferred out of the second stage compartment 13 by a waste drainage system 50. The separated water and fine debris flow out of the second stage compartment 13 along the downwardly sloping floor 11, through an opening 24 at the bottom of the baffle 20, and back into the first stage compartment 12.

Figure 2:
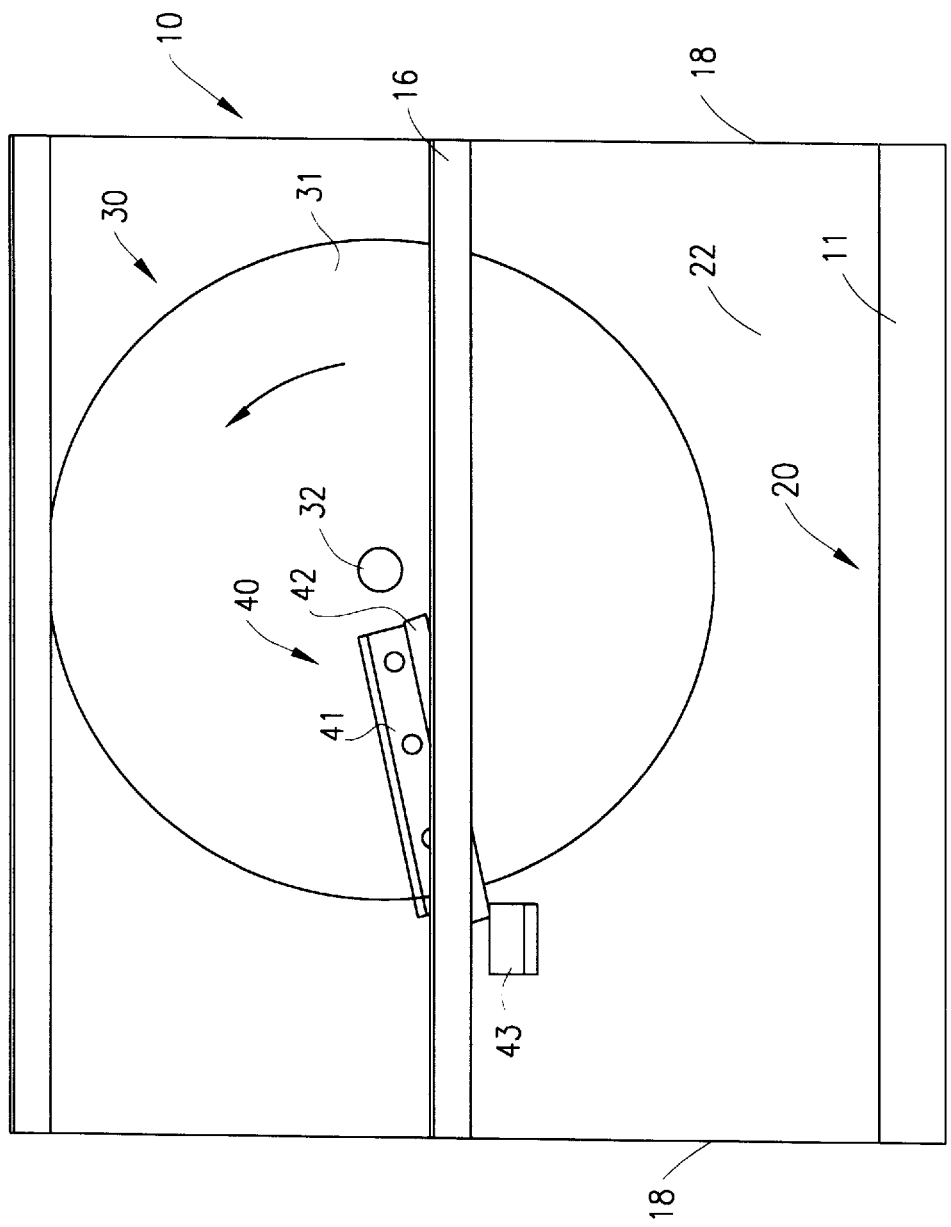
FIG. 2 is a side view showing a skimmer system and a waste collection system.
Figure 3:
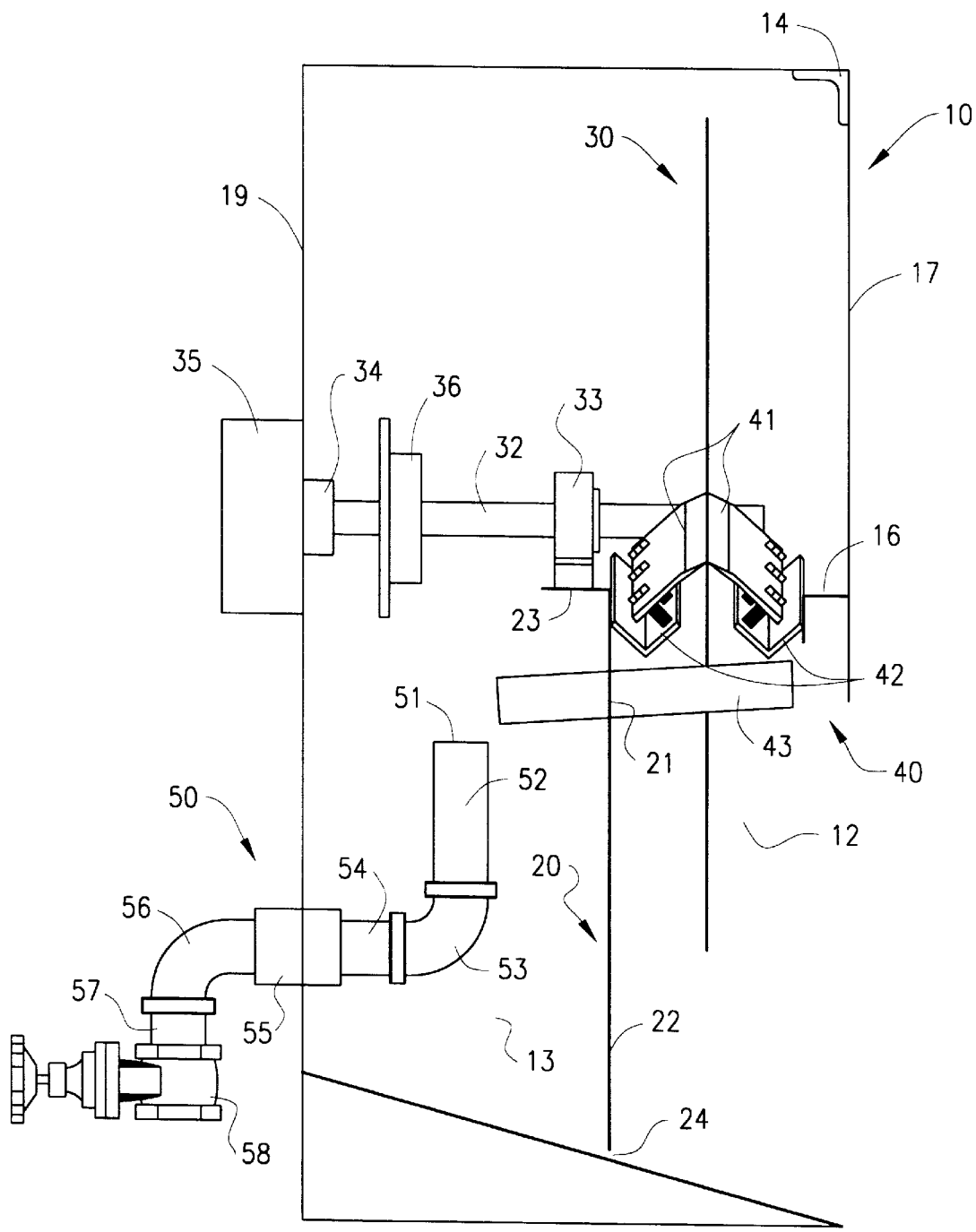
FIG. 3 is an end view showing the skimmer system, the waste collection system, a baffle, and a waste drainage system.
Figure 4:
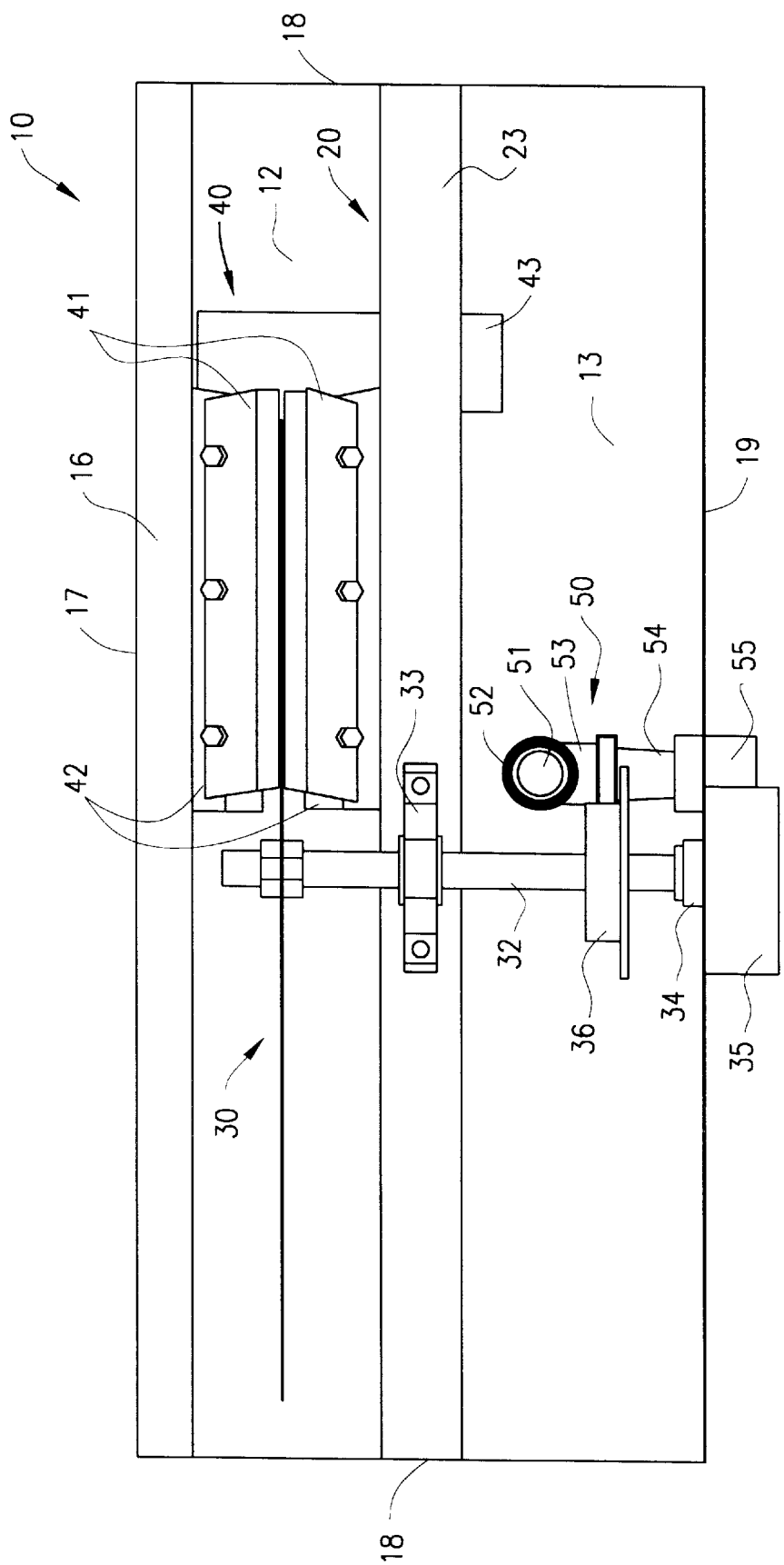
FIG. 4 is a top view showing the skimmer system, the waste collection system, the baffle, and the waste drainage system.

FIGS. 2, 3, and 4 show in greater detail the tank 10, the baffle 20, the skimmer system 30, the waste collection system 40, and the waste drainage system 50 shown in FIGS. 1A and 1B.

Figure 5A:
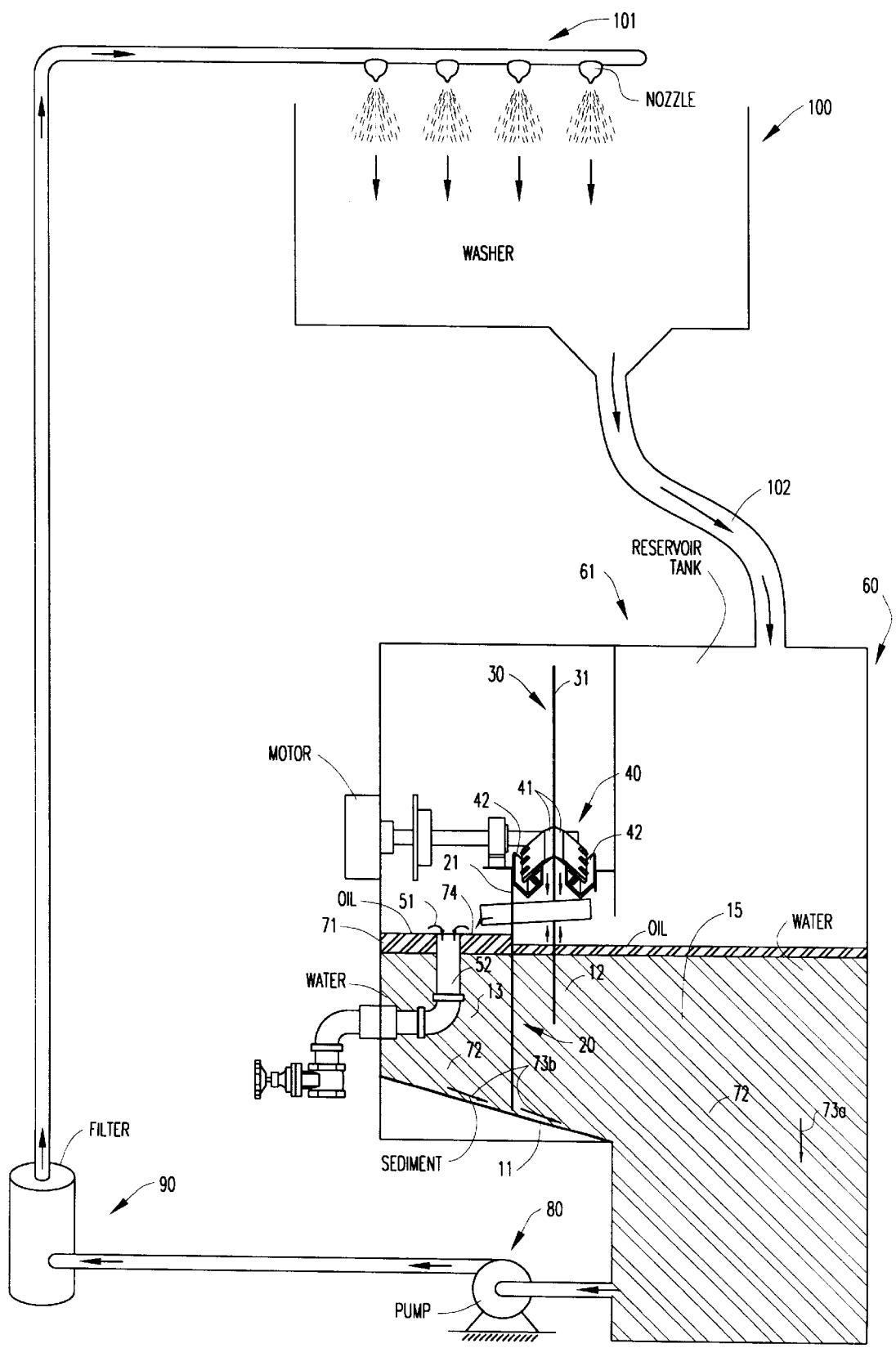
FIG. 5A is a schematic view of a parts washer and the present invention during operation, including an end sectional view of the preferred embodiment of the present invention containing a single skimmer attached to a reservoir tank of the parts washer.
Figure 5B:
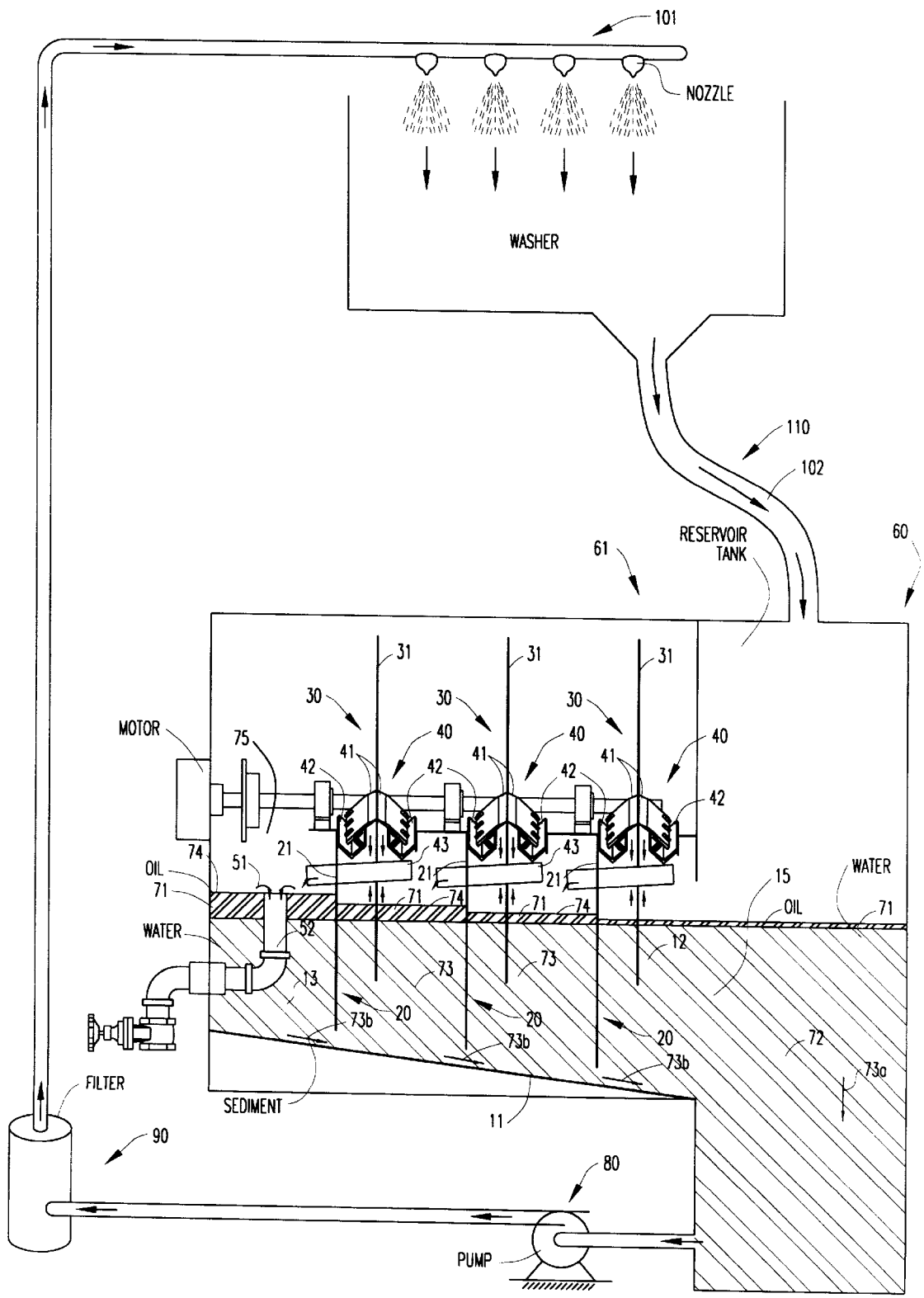
FIG. 5B is a schematic view of the parts washer and the present invention during operation, including an end sectional view of the preferred embodiment of the present invention containing multiple skimmers attached to the reservoir tank of the parts washer.

The tank 10 may be constructed of stainless steel to inhibit corrosion, and the corners may be sealed by welding. As shown in FIGS. 3 and 4, the corners may be reinforced with stainless steel angles 14. The single tank 10 is separated into the compartments 12 and 13 by the baffle 20, with the opening 24 defined between the bottom of the sloping floor 11 and a bottom edge of a vertical portion 22 of the baffle 20. In the preferred embodiment, the present invention may be attached directly to a reservoir tank 60 of a parts washer 100, as shown in FIGS. 5A and 5B. FIG. 3 shows an opening 15 in both the tank 10 and the parts washer reservoir tank 60 where such an attachment is effectuated. As shown in FIGS. 5A and 5B, the opening 15 allows waste liquid to flow from the parts washer reservoir tank 60 into the tank 10 of the present invention. In such a configuration, the tank 10 and reservoir tank 60 form a single large tank 61 with the baffle 20 separating the large tank into two compartments 12 and 13 wherein the first stage compartment 12 includes and incorporates the reservoir tank 60. As shown in FIGS. 2, 3, and 4, a support angle 16 is attached to a skimmer-side sidewall 17 and end walls 18 of the tank 10.

The baffle 20 includes a vertical portion 22 separating the first stage compartment 12 from the second stage compartment 13. A horizontal portion 23 of the baffle 20 is oriented perpendicular to the vertical portion 22. Both portions may be intequally formed from a flat stainless steel sheet. As shown in FIG. 2, the ends of the baffle 20 are fastened to the end walls 18 of the tank 10. As shown in FIG. 3, the bottom of the vertical portion 22 of the baffle 20 terminates above the sloped floor 11 to define an opening 24 between the baffle 20 and the sloped floor 11 through which water and fine debris may pass in flowing from the second stage compartment back into the first stage compartment.

The skimmer system 30 includes the skimmer disk 31, supported by a shaft 32, both of which rotate in a counter-clockwise direction (from the perspective illustrated in FIG. 2). The skimmer disk 31 has two roughened or textured disk surfaces that are a product of scoring or a similar process. As shown in FIGS. 3 and 4, the shaft 32 is supported by a bearing collar 33 at the horizontal portion 23 of the baffle 20 and by a bearing collar 34 at a drain-side sidewall 19 of the tank 10. The shaft 32 is rotated either by a motor 35 attached directly to the end of the shaft 32 or by a pulley or sprocket 36 which is rotated by a belt or chain (not shown) which is in turn attached to a motor located elsewhere.

The waste collection system 40 includes a pair of upwardly sloping wiper blades 41 oriented at an angle to the plane of the skimmer disk 31. The wiper blades 41 press against the sides of the skimmer disk 31 and are fastened to the inside faces of a pair of downwardly sloping wiper troughs 42. One wiper trough 42 is fastened to the support angle 16, and the other wiper trough 42 is fastened to the vertical portion 22 of the baffle 20. Each wiper trough 42 has an inner edge closest to the skimmer disk 31 and an outer edge away from the skimmer disk 31. The lower ends of the pair of wiper troughs 42 are positioned above a downwardly sloping discharge trough 43. As shown in FIG. 3, the discharge trough 43 is fastened near its upper end to the wiper trough 42 which is fastened to the support angle 16. The discharge trough 43 passes through an opening 21 in the vertical portion 22 of the baffle 20, and the discharge trough 43 is there fastened to the vertical portion 22 of the baffle 20.

The waste drainage system 50 comprises a standard pipe, elbow, and draincock assembly. The top of an inlet port 51 is placed at a height equal to the desired liquid surface level. The orientation of the inlet port 51 is parallel to the surface of the liquid (not shown). A vertical inlet pipe 52 is perpendicular to the surface of the liquid. An elbow 53 connects the vertical inlet pipe 52 to a horizontal drain pipe 54. The horizontal drain pipe 54 passes through a watertight fitting 55, through the drain-side sidewall 19, and connects to an elbow 56, which in turn connects to a vertical drain pipe 57. The vertical drain pipe 57 is fitted with a draincock 58, which is used to regulate the output flow of waste material from the skimmer.

Turning now to the operation of the present invention, FIG. 5A schematically depicts the process flow, with respect to one embodiment of the present invention, where the skimmer is attached to the reservoir tank 60 of a parts washer 100. In this embodiment, the skimmer includes a single skimmer system 30 and a single waste collection system 40. FIG. 5B schematically depicts the process flow, with respect to another embodiment of the present invention, where the skimmer is attached to the reservoir tank 60, but the skimmer includes multiple skimmer systems 30 and multiple waste collection systems 40.

As shown in FIG. 5A, a plurality of nozzles 101 spray an aqueous cleaning solution onto machine parts (not shown) contained within a spray cabinet of the parts washer 100. A waste liquid 102, which contains the waste material 71, water 72, and debris 73, drains through a parts washer drainage system 110 into the reservoir tank 60. The waste material 71, being lighter than water 72, floats to the surface in the first stage compartment 12. The force of gravity causes coarse debris 73a within the waste liquid 102 to settle to the bottom of the first stage compartment 12. Because the viscosities of oil and grease are higher than that of water, the waste material 71 is preferentially adsorbed over water by the partially-submerged rotating disk 31. Fine sediment 73b may adhere to the oil and grease, and in the absence of grease and oil, some water 72 may also be adsorbed by the skimmer disk 31, but in much smaller quantities due to its less viscous nature.

The pair of wiper blades 41 wipe the waste material 71 off of the rotating disk 31. The waste material 71 flows down the wiper blades 41 into the pair of downwardly-sloping wiper troughs 42. The waste material 71 then flows through the wiper troughs 42 into the downwardly-sloping discharge trough 43. The waste material 71 flows through the discharge trough 43, through the opening 21 in the baffle 20, and is deposited into the second stage compartment 13. The force of gravity then further separates the oil and grease in the waste material 71 from the water 72 and fine debris 73b collected in the second stage compartment 13. The waste material 71 floats to the surface, and the water 72 and fine debris 73b settle to the bottom. The separated water 72 washes the separated fine debris 73b downward along the downwardly-sloping tank bottom 11, through the opening 24 between the tank bottom 11 and the bottom edge of the vertical portion 22 of the baffle 20 back into the first compartment 12. As the liquid surface 74 of the collected oil and grease in the second stage compartment 13 rises, the waste material 71 rises above the inlet port 51 in the vertical drain pipe 52 and flows into the inlet port 51 through the waste drainage system 50 and out of the skimmer.

The water 72 separated in both the first and second stage compartments 12 and 13 is pumped out of the bottom of the parts washer tank 60, through a pump 80, through a filter 90, and is again sprayed through the plurality of nozzles 101 onto the parts to be cleaned in the parts washer 100. The waste liquid 102 from this washing operation drains through the parts washer drainage system 110 and back into the reservoir tank 60. The skimming process is then repeated.

As shown in FIG. 5B, the present invention provides for multiple skimmer systems 30 and multiple waste collection systems 40, which provide for the separation of additional water and debris at each stage. The plurality of nozzles 101 spray the aqueous cleaning solution onto machine parts (not shown) contained within the spray cabinet of the parts washer 100. The waste liquid 102, which contains the waste material 71, water 72, and debris 73, drains through the parts washer drainage system 110 into the reservoir tank 60. The waste material 71, being lighter than water 72, floats to the surface in the first stage compartment 12. The force of gravity causes coarse debris 73a within the waste liquid 102 to settle to the bottom of the first stage compartment 12. At each stage, the waste material 71 is adsorbed by the skimmer disk 31 in the first stage compartment 12, is wiped off by the wiper blades 41, and flows through the wiper troughs 42 and the discharge trough 43 into the intermediate stage compartments 75 and onto the liquid surface 74 of the collected oil and grease. There the waste material is adsorbed by the skimmer blade 31 in the next stage, and the process is repeated, incrementally separating additional water 72 and debris 73 from the waste material 71. In a final stage drain compartment 13, the waste material 71 rises above inlet port 51 in the vertical drain pipe 52 and flows into the inlet port 51 and out the waste drainage system 50. In each of the intermediate stage compartments 73 and the final stage compartment 13 waste material 71 separates from water 72 and fine debris 73b. The separated water 72 and fine debris 73b flow downward along the downwardly sloped tank bottom 11 through the openings 24 back into the first stage compartment 12.

The water 72 separated in both the first, intermediate and final stage compartments 12, 73 and 13 is pumped out of the bottom of the parts washer tank 60, through the pump 80, through the filter 90, and is again sprayed through the plurality of nozzles 101 onto the parts to be cleaned in the parts washer 100. The waste liquid 102 from this washing operation drains through the parts washer drainage system 110 and back into the reservoir tank 60. The skimming process is then repeated.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A system for removing waste material containing oil and grease from a mixture of oil, grease, and an aqueous solution, the device comprising:

a single tank including a floor;

a baffle separating the tank into a first stage compartment and a second stage compartment, the baffle defining an opening between a bottom edge of the baffle and the floor;

a waste material adsorption system for adsorbing waste material and some aqueous solution from the mixture as deposited in the first stage compartment;

a waste material collection system for collecting the adsorbed waste material and aqueous solution for deposit into the second stage compartment for gravity separation into a waste material portion and a non-waste material portion; and a waste material drainage system for draining the waste material portion from the second stage compartment;

wherein the gravity separated non-waste material portion from the second stage compartment passes back into the first stage compartment through the opening under the baffle.

2. The system as recited in claim 1, wherein the waste material adsorption system comprises a disk-type skimmer.

3. The system as recited in claim 2, wherein the waste collection system comprises:

a pair of upwardly-sloping wiper blades oriented to wipe against the disk-type skimmer to remove waste material; and a downwardly-sloping trough system for collecting wiped waste material for and transporting the wiped waste material to the second stage compartment.

4. The system as recited in claim 1, wherein the floor of the tank generally slopes downwardly from the second stage compartment to the first stage compartment.

5. The system as recited in claim 1, wherein the waste material drainage system comprises a standard pipe, elbow and draincock assembly.

6. The system as recited in claim 1, wherein the tank comprises a reservoir tank of a parts washer.

7. A system for removing waste material containing oil and grease from a mixture of oil, grease, and an aqueous solution, the device comprising:

a single tank including a floor;

two baffles separating the tank into a first stage compartment, a second stage compartment, and a third stage compartment, the baffles defining openings between a bottom edge of each baffle and the floor;

a first waste material adsorption system for adsorbing waste material and some aqueous solution from the mixture as deposited in the first stage compartment;

a first waste material collection system for collecting the adsorbed waste material and aqueous solution from the first stage compartment for deposit into the second stage compartment for gravity separation into a waste material portion and a non-waste material portion;

a second waste material adsorption system for adsorbing waste material and some aqueous solution from the waste material portion deposited in the second stage compartment;

a second waste material collection system for collecting the adsorbed waste material and aqueous solution from the second stage compartment for deposit into the third stage compartment for further gravity separation into a waste material portion and a non-waste material portion; and a waste material drainage system for draining the waste material portion from the third stage compartment;

wherein the gravity separated non-waste material portion from the second and third stage compartments passes back into the first stage compartment through the openings under the baffles.

8. The system as recited in claim 7, wherein the waste material adsorption system comprises a disk-type skimmer.

9. The system as recited in claim 8, wherein the waste collection system comprises:

a pair of upwardly-sloping wiper blades oriented to wipe against the disk-type skimmer to remove waste material; and a downwardly-sloping trough system for collecting wiped waste material for and transporting the wiped waste material to the second stage compartment.

10. The system as recited in claim 7, wherein the floor of the tank generally slopes downwardly from the third stage compartment to the second stage compartment to the first stage compartment.

11. The system as recited in claim 7, wherein the waste material drainage system comprises a standard pipe, elbow and draincock assembly.

12. The system as recited in claim 7, wherein the tank comprises a reservoir tank of a parts washer.

13. A method for removing waste material containing oil and grease from a mixture of oil, grease, and an aqueous solution, the method comprising:

introducing a waste liquid containing oil, grease, debris, and the aqueous solution into a first stage compartment of a single tank comprising first and second stage compartments separated by a single baffle with an opening between a bottom edge of the baffle and a floor of the tank;

gravitationally separating the oil, grease, and fine debris from the aqueous solution in the first stage compartment;

adsorbing the waste material containing oil, grease, fine debris, and some water from the mixture deposited in the first stage compartment;

collecting the adsorbed waste material in the second stage compartment;

gravitationally separating the collected adsorbed waste material into a waste material portion and a non-waste material portion;

draining the waste material portion from the second stage compartment; and allowing the gravity separated non-waste material portion to pass from the second stage compartment back into the first stage compartment through the opening under the baffle.

14. A parts washer, comprising:

a spray cabinet;

a plurality of nozzles for spraying high pressure cleaning solution within the spray cabinet;

a reservoir tank including a baffle dividing the reservoir tank into a first compartment and a second compartment, the first compartment collecting nozzle sprayed cleaning solution for initial gravity separation into a waste material portion and a non-waste cleaning solution portion, and the baffle defining an opening between a bottom edge thereof and a floor of the reservoir tank;

a waste material adsorption system for adsorbing the waste material portion and some non-waste cleaning solution portion from the collected cleaning solution in the first compartment;

a waste material collection system for collecting the adsorbed waste material and some non-waste cleaning solution portions for deposit into the second compartment for further gravity separation into a waste material portion and or non-waste cleaning solution portion;

a waste material drainage system for draining the waste material portion from the second compartment, wherein the separated non-waste cleaning solution portion from the second compartment passes back into the first compartment through the opening under the baffle; and a pump for pumping the non-waste cleaning solution portion from the reservoir tank to the plurality of nozzles.

15. The parts washer as in claim 14 wherein at least a portion of the floor of the reservoir tank adjacent the second compartment generally slopes downwardly from the second compartment toward the first compartment.

16. The parts washer as in claim 14 further including a filter for filtering the non-waste cleaning solution portion prior to nozzle spraying.

* * * * *